(12) United States Patent
Hill

(10) Patent No.: US 8,322,581 B2
(45) Date of Patent: Dec. 4, 2012

(54) PUSH TUBE ADAPTER FOR AN OFF-ROAD VEHICLE

(76) Inventor: Curt J. Hill, Warba, MN (US)

(*) Notice: Subject to any disclaimer, the term of this patent is extended or adjusted under 35 U.S.C. 154(b) by 50 days.

(21) Appl. No.: 13/066,667

(22) Filed: Apr. 21, 2011

(65) Prior Publication Data
US 2012/0267407 A1 Oct. 25, 2012

(51) Int. Cl.
B60R 9/06 (2006.01)
E01H 5/04 (2006.01)

(52) U.S. Cl. .......... 224/401; 224/518; 37/231; 172/817

(58) Field of Classification Search .................. 224/401, 224/488, 500, 518, 545, 550; 37/231; 172/817
See application file for complete search history.

(56) References Cited

U.S. PATENT DOCUMENTS

| 2,094,515 | A | 9/1937 | Abbe |
| 2,171,830 | A | 9/1939 | Hayes |
| 2,228,490 | A | 1/1941 | Smith |
| 2,426,410 | A | 8/1947 | Owen |
| 3,012,345 | A | 12/1961 | Krueger |
| 3,410,008 | A | 11/1968 | Standfuss |
| 3,881,261 | A | 5/1975 | Lavoie |
| 3,898,753 | A | 8/1975 | Kinnunen |
| 4,215,496 | A | 8/1980 | Wehr |
| 4,615,130 | A | 10/1986 | Racicot |
| 4,962,598 | A | 10/1990 | Woolhiser |
| 4,976,053 | A | 12/1990 | Caley |
| 5,044,098 | A | 9/1991 | Berghefer |
| 5,081,775 | A | 1/1992 | Veilleux |
| 5,088,215 | A | 2/1992 | Ciula |
| 5,141,385 | A | 8/1992 | Tibbatts et al. |
| 5,615,745 | A | 4/1997 | Cross |
| 5,909,960 | A * | 6/1999 | Jager et al. ...................... 37/235 |
| RE37,628 | E | 4/2002 | Segorski et al. |
| 6,502,334 | B1 | 1/2003 | Davies |
| 6,843,002 | B1 | 1/2005 | Moffitt |
| 6,931,770 | B2 | 8/2005 | Belzile |
| 6,957,505 | B1 | 10/2005 | Moffitt |
| 7,028,423 | B1 | 4/2006 | Curry |
| 7,219,453 | B2 | 5/2007 | Baker |
| 7,975,407 | B2 * | 7/2011 | Dilworth et al. ................. 37/231 |
| 7,997,015 | B2 * | 8/2011 | Belzile et al. .................... 37/231 |
| 2006/0283053 | A1 | 12/2006 | Hickenbottom |
| 2008/0104865 | A1 * | 5/2008 | Bailey ............................. 37/231 |
| 2008/0172913 | A1 * | 7/2008 | Bailey et al. .................... 37/468 |

OTHER PUBLICATIONS

Cycle Country "ALL MOUNT" Product Manual, dated Dec. 22, 2009.*
Quad Boss "Pile Driver" Product Manual, dated Jun. 6, 2011.*

* cited by examiner

Primary Examiner — Justin Larson
(74) Attorney, Agent, or Firm — Dennis L. Thomte; Thomte Patent Law Office LLC

(57) ABSTRACT

A push tube adapter for an off-road vehicle which enables the rearward end of a push tube assembly to be mounted on various vehicle mounts.

4 Claims, 7 Drawing Sheets

PUSH TUBE ADAPTER FOR AN OFF-ROAD VEHICLE

BACKGROUND OF THE INVENTION

1. Field of the Invention

This invention relates to a push tube adapter for an off-road vehicle and more particularly to an adapter which enables the rearward end of a push tube assembly to be attached to various mounts secured to the underside of the off-road vehicle.

2. Description of the Related Art

In recent years, it has become common to mount an implement such as a plow blade, mower or rotary sweeper on the forward end of an off-road vehicle such as an ATV, UTV, garden tractor or the like. A majority of manufacturers utilize an elongated push tube assembly to mount the implement onto the vehicle. Most push tube assemblies include a pair of elongated, horizontally spaced-apart push tubes having forward and rearward ends. Manufacturers such as Cycle Country Accessories Corporation ("CCAC"), Warn Industries ("Warn"), and Moose Utility Division ("Moose") secure the rearward ends of the push tubes to the underside of the vehicle midway between the forward and rearward ends of the vehicle. The above manufacturers secure a mount or mount plate to the frame of the vehicle with the mount having a pair of transversely spaced-apart pivot brackets secured thereto to which the rearward ends of the pivot tubes are pivotally secured about a horizontal axis. The pivot brackets on the mount of CCAC are 12.5 inches apart. The pivot brackets on the mount of Moose are 7.25 inches apart while the pivot brackets on the mount of Warn are 12.25 inches apart.

The difference in the spacing of the pivot brackets of CCAC, Warn and Moose prevents a CCAC push tube assembly from being mounted on a Warn or Moose mount, prevents a Warn push tube assembly to be mounted on a CCAC or Moose mount, and prevents a Moose push tube assembly to be mounted on a CCAC or Warn mount.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An adapter for attaching the rearward end of a push tube assembly to a mount secured to the underside of an off-road vehicle is disclosed. The adapter is adapted to be utilized with an elongated, generally horizontally disposed push tube assembly which is used for attaching an implement to an off-road vehicle having a forward end, a rearward end, an underside and a mount secured to the underside thereof with the mount including a pair of transversely spaced-apart mounting brackets. The push tube assembly includes first and second elongated push tubes having forward and rearward ends.

The adapter of this invention is comprised of a generally horizontally disposed and rectangular flat adapter plate having a first end, a second end, a forward end, a rearward end, a top surface and a bottom surface. The adapter plate has a first pair of bolt openings formed therein adjacent the first end thereof and has a second pair of bolt openings formed therein adjacent the second end thereof. The adapter plate has a third pair of bolt openings formed therein laterally inwardly of the first pair of bolt openings and has a fourth pair of bolt openings formed therein laterally inwardly of the second pair of bolt openings.

The adapter also includes a first mounting bracket having a horizontally disposed bottom wall portion having a first end, a second end, a first side and a second side, and an upstanding wall portion extending upwardly from the second side of the bottom wall portion with the upstanding wall portion having at least one opening formed therein adjacent the upper end thereof. The bottom wall portion of the first mounting bracket has a pair of bolt openings formed therein.

The adapter also includes a second mounting bracket having a horizontally disposed bottom wall portion having a first end, a second end, a first side and a second side, and an upstanding wall portion extending upwardly from the second side of the bottom wall portion with the upstanding wall portion having at least one opening formed therein adjacent the upper end thereof. The bottom wall portion of the second mounting bracket has a pair of bolt openings formed therein. The rearward ends of the first and second push tubes are secured to the adapter plate so as to extend forwardly therefrom.

Each of the first and second mounting brackets are selectively secured to the adapter plate in first, second and third positions so that the rearward end of the push tube assembly may be selectively secured to at least three different mounts with the upper ends of the upstanding wall portions of the first and second mounting brackets being pivotally secured to the pivot brackets on the mount which is secured to the underside of the off-road vehicle.

It is therefore a principal object of the invention to provide a push tube adapter for use with an off-road vehicle so that the push tube assembly thereof may be secured to at least three different mounts secured to the underside of an off-road vehicle.

A further object of the invention is to provide a push tube adapter of the type described above which enables a CCAC push tube assembly to be secured to a CCAC mount, a Warn mount, or a Moose mount.

A further object of the invention is to provide an adapter of the type described which enables a Moose push tube assembly to be selectively secured to a CCAC or Warn mount.

A further object of the invention is to provide a push tube adapter of the type described which enables a Warn push tube assembly to be selectively secured to a CCAC or Moose mount.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 2A:
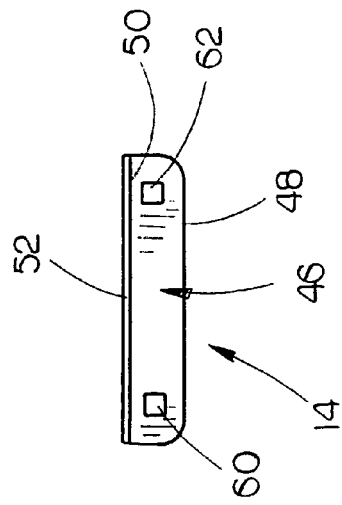
FIG. 2A is a top view of one of the mounting brackets of the push tube adapter of this invention.
Figure 2B:
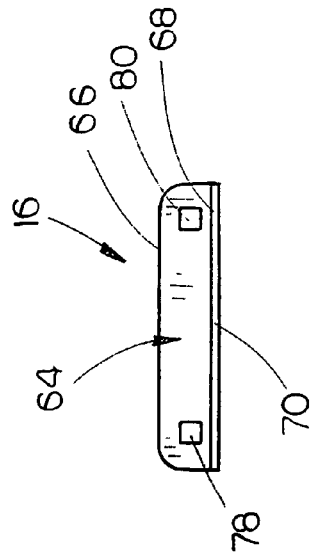
FIG. 2B is a top view of the other mounting brackets.
Figure 1:
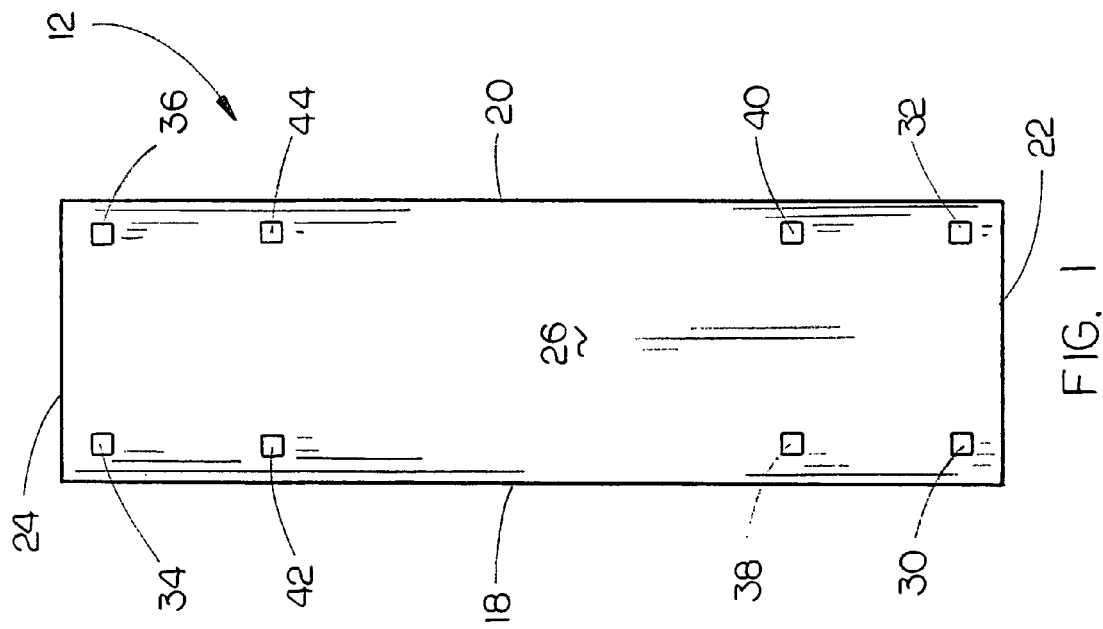
FIG. 1 is a top view of the adapter plate of the push tube adapter of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the adapter of this invention including an adapter plate 12, a first mounting bracket 14 and a second mounting bracket 16. For purposes of description, adapter plate 12 will be described as having a forward end 18, rearward end 20, a left end 22, right end 24, top surface 26 and bottom surface 28. As seen, adapter plate 12 is generally rectangular in configuration and is preferably constructed of a steel material. Adapter plate 12 has bolt openings 30 and 32 formed therein adjacent left end 22, bolt openings 34 and 36 formed therein adjacent right end 24, bolt openings 38 and 40 formed therein inwardly of bolt openings 30 and 32 respectively, and bolt openings 42 and 44 formed therein inwardly of bolt openings 34 and 36 respectively. Bolt openings 30 and 32 will be described as being a first pair of bolt openings with bolt openings 34 and 36 being described as a second pair of bolt openings. Bolt openings 38 and 40 will be described as a third pair of bolt openings while bolt openings 42 and 44 will be described as being a fourth pair of bolt openings.

Mounting bracket 14 includes a bottom wall portion 46 having a first end 48 and a second end 50. Mounting bracket 14 also includes an upstanding wall portion 52 which extends upwardly from the second end 50 of bottom wall portion 48. Upstanding wall portion 52 includes a tapered upper end 54. At least one and preferably two bolt openings or pin openings 56 and 58 are formed in upstanding wall portion 52 as seen in the drawings. Bottom wall portion 46 includes a pair of bolt openings 60 and 62 formed therein.

Mounting bracket 16 includes a bottom wall portion 64 having a first end 66 and a second end 68. Mounting bracket 16 also includes an upstanding wall portion 70 which extends upwardly from the second end 68 of bottom wall portion 64. Upstanding wall portion 70 has a tapered upper end 72. At least one and preferably two pin openings or bolt openings 74 and 76 are formed in upstanding wall portion 72 adjacent the upper end thereof as illustrated in the drawings. Bottom wall portion 64 has a pair of bolt openings 78 and 80 formed therein as seen.

In the drawings, the numeral 84 refers to a push tube assembly which is manufactured by CCAC of Spencer, Iowa. Push tube assembly 84 includes elongated push tubes 86 and 88 having a front adapter assembly 90 at the forward ends thereof. The adapter assembly 90 is designed to be secured to an implement such as a plow blade, rotary sweeper, mower, trash shuttle, etc. The rearward ends of push tubes 86 and 88 are secured to the adapter plate 12 by welding or bolts. Although a CCAC push tube assembly 84 is shown, the push tube assembly could be that manufactured by any manufacturer such as Moose Utility Division or Warn Industries.

The mounting brackets 14 and 16 of adapter 10 are designed to be pivotally connected to a pair of pivot brackets secured to a mount or mounting plate secured to the underside of the an off-road vehicle such as an ATV, UTV or garden tractor.

Figure 3:
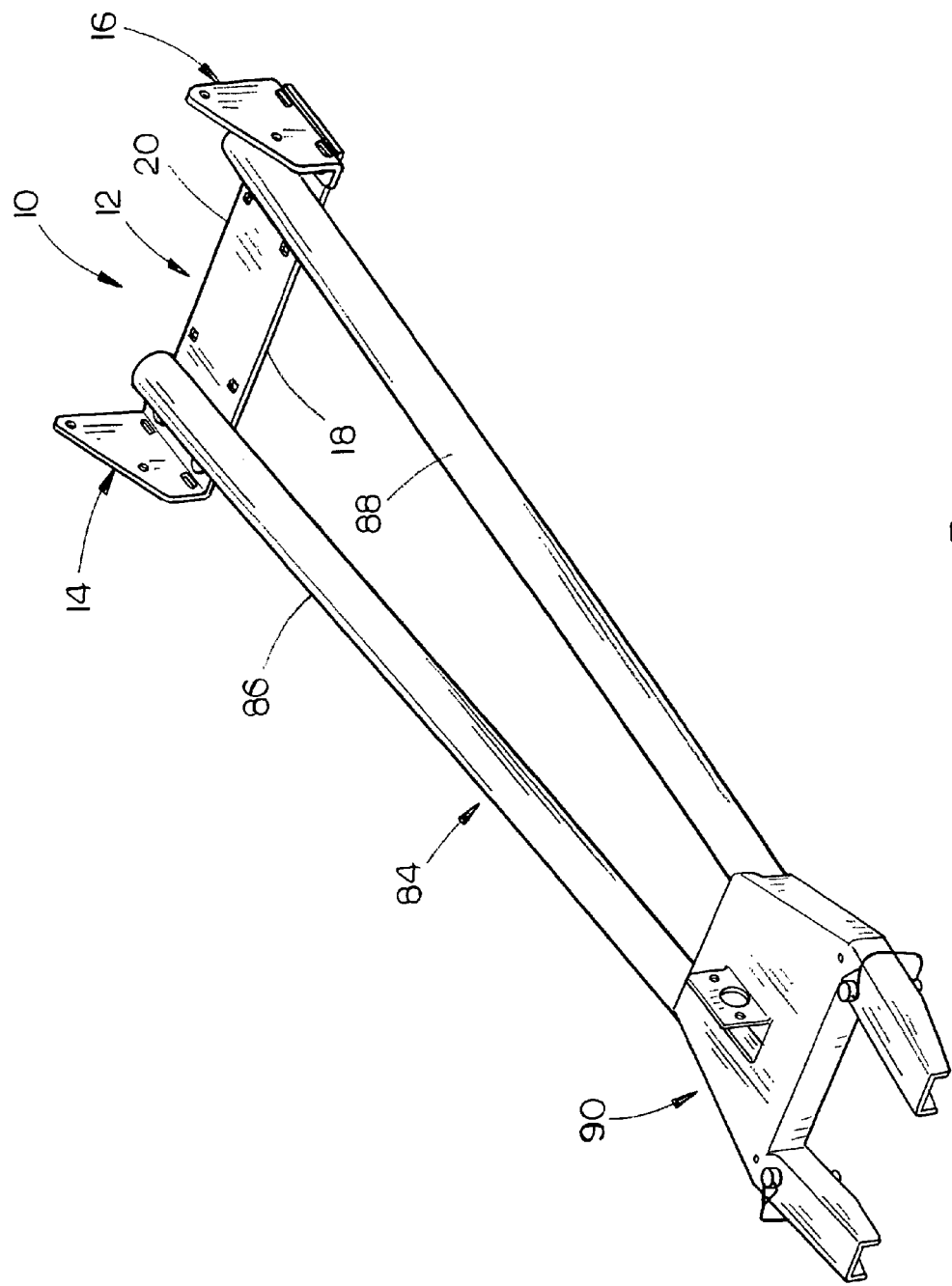
FIG. 3 is a perspective view illustrating the adapter of this invention assembled in a first configuration.
Figure 4:
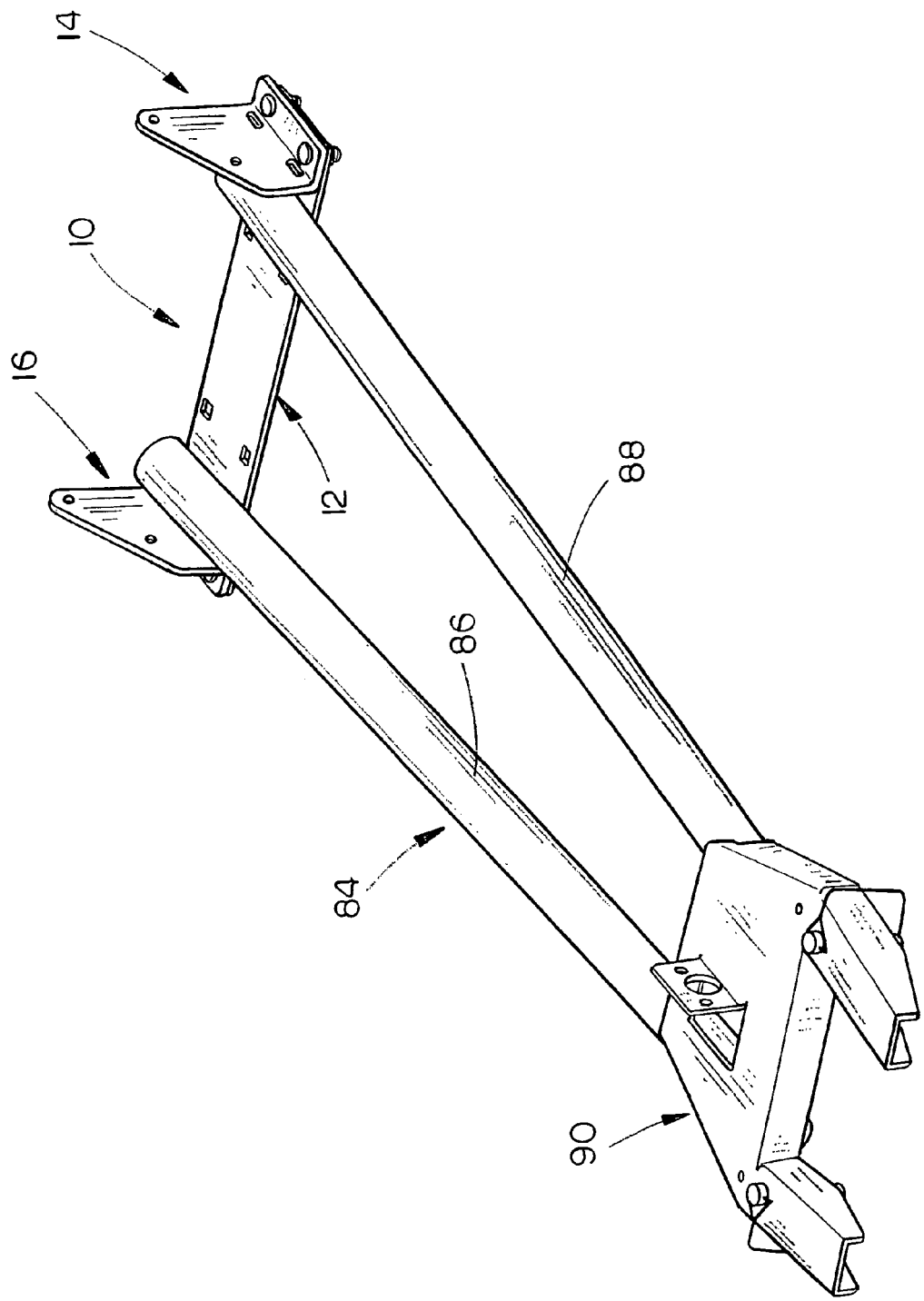
FIG. 4 is a perspective view illustrating the adapter of this invention assembled in a second configuration.
Figure 5:
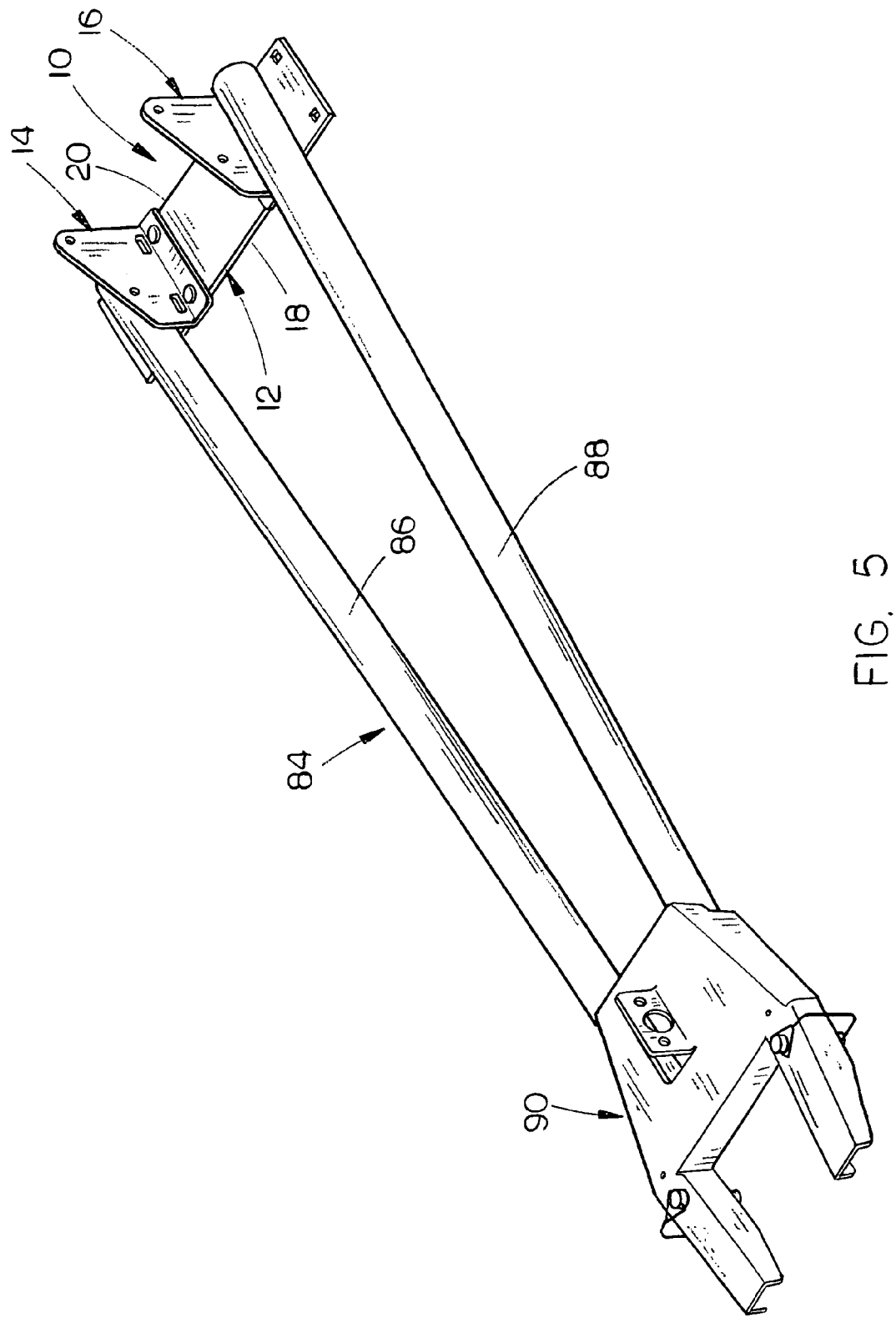
FIG. 5 is a perspective view illustrating the adapter of this invention assembled in a third configuration.
Figure 6:
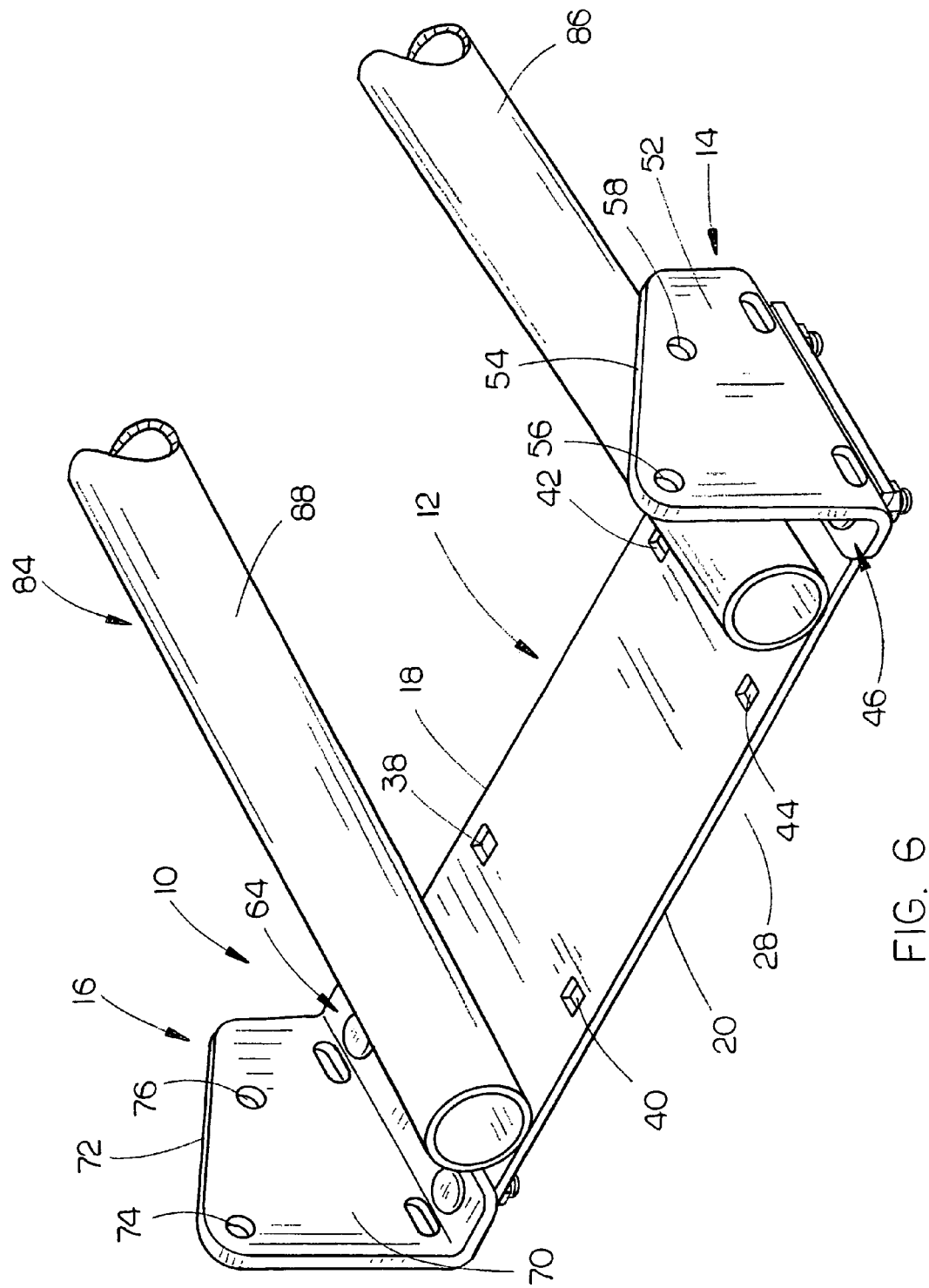
FIG. 6 is an enlarged partial perspective view of that shown in FIG. 3.
Figure 7:
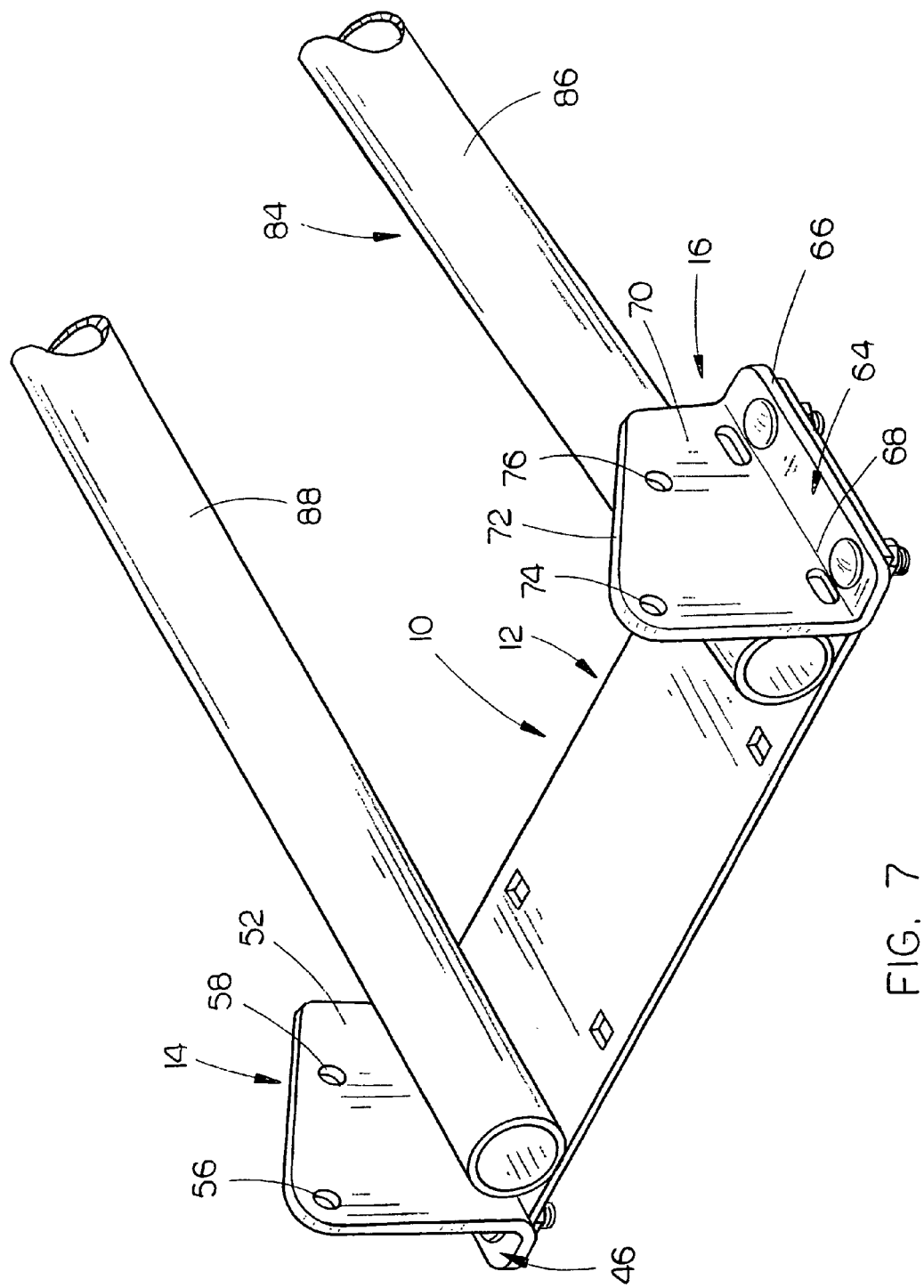
FIG. 7 is an enlarged partial perspective view of that shown in FIG. 4.
Figure 8:
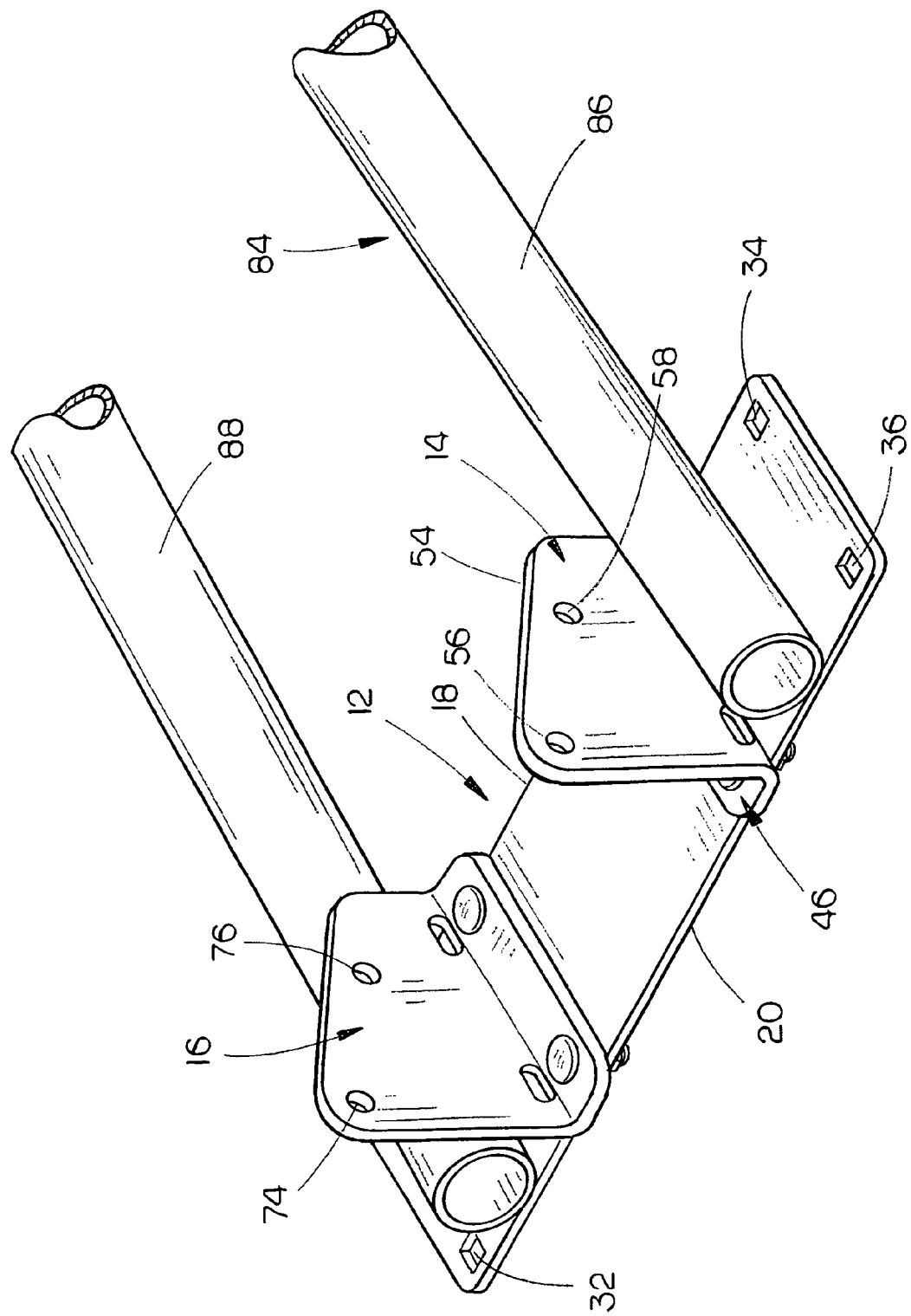
FIG. 8 is an enlarged partial perspective view of that shown in FIG. 5.

When the push tube assembly 84 is to be secured to a mount wherein the pivot brackets thereof are spaced 12.5 inches apart, the mounting bracket 14 will be secured to the right end of adapter plate 12 and the mounting bracket 16 will be secured to the left end of adapter plate as seen in FIGS. 3 and 6. In that position, the bolt openings in the bottom wall portion 46 of mounting bracket 14 will be aligned with openings 34 and 36 in adapter plate 12 and the bolt openings in bottom wall portion 64 of mounting bracket 16 will be aligned with openings 30 and 32 in adapter plate 12 with carriage bolts 92 extending therethrough to secure the mounting brackets 14 and 16 to adapter plate 12. As seen in FIGS. 3 and 6, the upstanding wall portions 52 and 70 of mounting brackets 14 and 16 are at the outer sides of the mounting brackets 14 and 16 respectively. When the adapter 10 is to be secured to a mount wherein the pivot brackets thereto are 12.25 inches apart, mounting bracket 16 will be secured to the right end of adapter plate 12 and the mounting bracket 14 will be secured to the left end of adapter plate 12 as seen in FIGS. 4 and 7. In that position, mounting bracket 14 is positioned at the left end of adapter plate and the mounting bracket is positioned at the right end of adapter plate 12 with the upstanding wall portions of the mounting brackets 14 and 16 being at the inner sides thereof. Carriage bolts 92 secure the mounting brackets 14 and 16 to adapter plate 12. When the adapter 10 is to be secured to a mount wherein the pivot brackets thereof are 7.5 inches apart, mounting bracket 14 will be positioned as seen in FIGS. 5 and 8. In that position, the bolt openings in the bottom wall portion 46 of mounting bracket 14 are aligned with bolt openings 42 and 44 of adapter plate 12 and the bolt openings in the bottom wall portion 64 of mounting bracket 16 are aligned with bolt openings 38 and 40 of adapter plate 12 with the upstanding wall portions of the mounting brackets 14 and 16 being at the outer sides thereof. Carriage bolts 92 secure mounting brackets 14 and 16 to adapter plate 12.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:

an elongated, generally horizontally disposed push tube assembly for use in attaching an implement to an off-road vehicle having a forward end, a rearward end, an underside, and a mount secured to the underside thereof with the mount including a pair of transversely spaced-apart mounting brackets;

said push tube, assembly including first and second elongated push tubes having forward and rearward ends;

a generally horizontally disposed and generally rectangular flat adapter plate having a first end, a second end, a forward end, a rearward end, a top surface and a bottom surface;

said adapter plate having a first pair of bolt openings formed therein adjacent said first end thereof;

said adapter plate having a second pair of bolt openings formed therein adjacent said second end thereof;

said adapter plate having a third pair of bolt openings formed therein laterally inwardly of said first pair of bolt openings;

said adapter plate having a fourth pair of bolt openings formed therein laterally inwardly of said second pair of bolt openings;

a first mounting bracket having a horizontally disposed bottom wall portion, having a first end, a second end, a first side and a second side, and an upstanding wall portion extending upwardly from said second side of said bottom wall portion with the upstanding wall portion having at least one opening formed therein adjacent the upper end thereof;

said bottom wall portion of said first mounting bracket having a pair of bolt openings formed therein;

a second mounting bracket having a horizontally disposed bottom wall portion, having a first end, a second end, a first side and a second side, and an upstanding wall portion extending upwardly from said second side of said bottom wall portion with the upstanding wall portion having at least one opening formed therein adjacent the upper end thereof;

said bottom wall portion of said second mounting bracket having a pair of bolt openings formed therein;

said rearward ends of said first and second push tubes being secured to said adapter plate so as to extend forwardly therefrom;

each of said first and second mounting brackets being selectively secured to said adapter plate in first and second and third positions so that said rearward end of said push tube assembly may be selectively secured to at least three different mounts;

when said rearward end of said push tube assembly is to be secured to a first mount, said first mounting bracket is positioned on said top surface of said adapter plate so that said first side of said bottom wall portion thereof is positioned above said first end of said adapter plate with said pair of bolt openings in said bottom wall portion of said first mounting bracket registering with said first pair of bolt opening sin said adapter plate to receive bolts extending therethrough to secure said first mounting bracket to said adapter plate, with said second mounting bracket being positioned on said top surface of said adapter plate so that said first side of said bottom wall portion thereof is positioned above said second end of said adapter plate with said pair of bolt openings in said bottom wall portion of said second mounting bracket registering with said second pair of bolt openings in said adapter plate to receive bolts extending therethrough to secure said second mounting bracket to said adapter plate;

when said rearward side of said push tube assembly is to be secured to a second mount, said second mounting bracket is positioned on said top surface of said adapter plate so that said second side of said second mounting bracket is positioned above said first end of said adapter plate with said pair of bolt openings in said bottom wall portion of said second mounting bracket registering with said first pair of bolt openings in said adapter plate to receive bolts extending therethrough to secure said second mounting bracket to said adapter plate, with said first mounting bracket being positioned on said top surface of said adapter plate so that said second side of said bottom wall portion thereof is positioned above said second end of said adapter plate with said pair of bolt openings in said bottom wall portion of said first mounting bracket registering with said second pair of bolt openings in said adapter plate to receive bolts extending therethrough to secure said first mounting bracket to said adapter plate;

when said rearward end of said push tube assembly is to be secured to a third mount, said first mounting bracket is positioned on said top surface of said adapter plate so that said second side of said bottom wall portion thereof is positioned laterally outwardly of said first side thereof and so that said pair of bolt openings in said bottom wall portion thereof registers with said third pair of bolt openings in said adapter plate to receive bolts extending therethrough to secure said first mounting bracket to said adapter plate, with said second mounting bracket being positioned on said top surface of said adapter plate so that said second side of said bottom wall portion of said second mounting bracket is positioned laterally outwardly of said first side thereof and so that said pair of bolt openings in said bottom wall portion thereof register with said fourth pair of bolt openings in said adapter plate to receive bolts extending therethrough to secure said second mounting bracket to said adapter plate.

2. The combination of claim 1 wherein the upper end of said upstanding wall portion of said first mounting bracket has a first end and a second end with said second end thereof dwelling in a plane above said first end thereof and wherein the upper end of said upstanding wall portion of said second mounting bracket has a first end and a second end with said second end thereof dwelling in a plane above said first end thereof.

3. The combination of claim 1 wherein the upper end of each of said first and second mounting brackets having a pair of openings formed therein.

4. The combination of claim 2 wherein the upper end of said upstanding wall portion of said first mounting bracket has a first opening formed therein adjacent said first end thereof and has a second opening formed therein adjacent said second end thereof and wherein the upper end of said upstanding wall portion of said second mounting bracket has a first opening formed therein adjacent said first end thereof and has a second opening formed therein adjacent said second end thereof.

* * * * *